US008828600B2

United States Patent
Kado et al.

(10) Patent No.: US 8,828,600 B2
(45) Date of Patent: Sep. 9, 2014

(54) BATTERY WITH REINFORCING MEMBER FOR PRESS-FITTED TERMINAL

(75) Inventors: Hiroyasu Kado, Toyota (JP); Shigeru Takashiro, Toyota (JP); Shigetaka Nagamatsu, Nagoya (JP); Keigo Yamada, Toyota (JP); Kaori Ueda, Toyota (JP); Takahiro Oshima, Nagoya (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 12/936,543

(22) PCT Filed: Jul. 24, 2009

(86) PCT No.: PCT/JP2009/003493
§ 371 (c)(1),
(2), (4) Date: Oct. 6, 2010

(87) PCT Pub. No.: WO2011/010350
PCT Pub. Date: Jan. 27, 2011

(65) Prior Publication Data
US 2012/0115022 A1   May 10, 2012

(51) Int. Cl.
*H01M 2/06* (2006.01)
*H01M 2/30* (2006.01)
*H01M 2/08* (2006.01)
*H01M 10/052* (2010.01)

(52) U.S. Cl.
CPC *H01M 2/30* (2013.01); *H01M 2/06* (2013.01); *Y02E 60/12* (2013.01); *H01M 10/052* (2013.01); *H01M 2/305* (2013.01)
USPC .......................................... 429/179

(58) Field of Classification Search
USPC ............... 429/171–185; 29/623.1, 623.2, 731
See application file for complete search history.

(56) References Cited

U.S. PATENT DOCUMENTS 3,907,154 A * 9/1975 Jesevich et al. ............... 220/661
4,559,283 A * 12/1985 Kruger et al. ................. 429/174

(Continued)

FOREIGN PATENT DOCUMENTS

CN  1462099   12/2003
CN  1594892   3/2005

(Continued)

OTHER PUBLICATIONS

English Machine Translation of JP 2005-339990 to Enoshima et al.*

(Continued)

*Primary Examiner* — Milton I Cano
*Assistant Examiner* — Michael Dignan
(74) *Attorney, Agent, or Firm* — Finnegan, Henderson, Farabow, Garrett & Dunner, LLP

(57) ABSTRACT

The present disclosure provides a battery, which includes a case having through holes, electric terminals projecting outward from the case and fixed to the holes, and insulating members interposed between the case and the terminals. A flanged portion standing out from the case, located around the hole is formed, a reinforcing member is fitted to the outer periphery of the flanged portion that reinforces against the outward force applied to the flanged portion, and the terminal and the insulating member are inserted into the flanged portion, and then the flanged portion is press-fitted from the outside of the case for fixing the terminal to the hole. The battery may have a high sealing property at the fitted portion among the case and the terminal.

3 Claims, 12 Drawing Sheets

(56) References Cited

U.S. PATENT DOCUMENTS

| | | | |
|---|---|---|---|
| 4,879,191 A | * | 11/1989 | Sindorf .................. 429/181 |
| 2012/0115022 A1 | | 5/2012 | Kado et al. |

FOREIGN PATENT DOCUMENTS

| | | |
|---|---|---|
| CN | 200954758 | 10/2007 |
| EP | 0 598 136 | 5/1994 |
| JP | 54-66122 U | 5/1979 |
| JP | 58-112245 | 7/1983 |
| JP | 6-22933 | 6/1994 |
| JP | 7-53422 | 6/1995 |
| JP | 7-236929 | 9/1995 |
| JP | 2001-127464 | 5/2001 |
| JP | 2001-334335 | 12/2001 |
| JP | 3334804 | 10/2002 |
| JP | 2003-197177 | 7/2003 |
| JP | 2005-183359 | 7/2005 |
| JP | 2005-302625 | 10/2005 |
| JP | 2005-339990 | 12/2005 |
| JP | 2006-19292 | 1/2006 |
| JP | 2007-179803 | 7/2007 |
| JP | 2007179803 * | 7/2007 ............. H01M 2/06 |
| JP | 2007-273392 | 10/2007 |
| WO | WO 2011/010350 | 1/2011 |

OTHER PUBLICATIONS

Machine English Translation of JP 2007179803 to Matsumoto.*

* cited by examiner

▨ Pressed Portion By First Blades
▧ Pressed Portion By Second Blades (a)

(b)

BATTERY WITH REINFORCING MEMBER FOR PRESS-FITTED TERMINAL

CROSS-REFERENCE TO RELATED APPLICATIONS

This application is a national phase application of International Application No. PCT/JP2009/003493, filed Jul. 24, 2009, the contents of which are incorporated herein by reference.

TECHNICAL FIELD

The present invention relates to a battery, especially to the battery including an electric terminal fitted into a case with penetrating therethrough and projecting therefrom, in which the sealing property at the fitted portion is improved.

BACKGROUND ART

The case served as a housing of the battery includes a box and a lid. The box contains an electrode body as a power generating element and has an opening to form a closed-end shape. The plate lid has a shape in accordance with the opening of the box to cover it.

The lid has a pair of through holes from which electric terminals are projected outward. The terminals serve as the positive and negative electrode terminal for transmitting the electric power from the element.

The case is provided with a safety unit such as a relief valve penetrating therethrough in the thickness direction. For example, the relief valve works in the case that the defect such as a short circuit results in generation of large volume of gas, communicating the inside of the battery with the outside to prevent the internal pressure from increasing.

When the battery is a nonaqueous electrolyte secondary battery such as a lithium ion secondary battery, the contamination of water into the battery has an influence on the battery performance, so that the sealing property has to be secured. Furthermore, considering when the inner pressure raises caused by the inside defect, it is worth to seal the other portions to operate the safety unit securely.

Regarding the case of the battery, the box and lid are firmly fixed by welding or the like, so that in the fitted portion of the terminal into the lid, it is required to keep the fitting property of the terminal not to slip out from the lid, the sealing property for preventing from leaking the electrolytes contained in the case and gases generated in the battery, and the insulating property between the terminal and the case.

So, in the battery manufacturing process, especially when fitting the terminal into the through hole formed in the lid, it is important to secure the sealing property of the fitted portion.

Patent Literature 1 discloses a battery having an electric terminal projecting from a lid of the battery, in which an insulating member is arranged between the lid and terminal and the lid is provided with a flanged portion standing out around the insulating member, enabled to keep the sealing property between the lid and the terminal by press-fitting the flanged portion from the direction parallel to the lid, that is the direction perpendicular to the thickness direction of the lid.

Unfortunately, according to the use of the battery, a temperature cycle including heating and cooling is repeated, whereby the press-fitted portion is loosened to return the former shape and the sealing property is degraded.

[Patent Literature 1] JP 2005-302625 A

DISCLOSURE OF INVENTION

Problems to be Solved by the Invention

The objective of the present invention is to provide an unexpected battery including a case and an electric terminal fitted to the case with projecting therefrom, provided with high sealing property at the fitted portion between the case and terminal.

Means of Solving the Problems

The first aspect of the present invention is a method of manufacturing a battery, which includes a case provided with a through hole; an electric terminal fixed to the through hole with projecting outward from the case; and an insulating member interposed between the case and the terminal.

In the embodiment of the method as the first aspect, a flanged portion standing out from the case is formed around the through hole, a reinforcing member for reinforcing against an outward force is fitted to an outer periphery of the flanged portion, the terminal surrounded by the insulating member is inserted into the through hole, and the flanged portion is press-fitted from outside of the case to deform plastically and to fix the terminal to the through hole.

In the method of the first aspect, the reinforcing member is preferably composed of a material having higher strength than the case.

In the advantageous embodiment, the reinforcing member has a portion where is different in thickness in the direction from inner periphery to outer periphery of the flanged portion.

The thickness may be preferable not to differ in the circumferential direction, however providing the thickness different portion enables to apply effects in addition to the sealing property, e.g. a torque resistance against the rotation.

In the preferable embodiment, when press-fitting the flanged portion, there is a variation in deforming amount in the flanged portion.

Thus, the effects are obtained that the torque resistance against the rotation as well as the sealing property, and the embodiment is applicable to various terminals not limiting the column shape (the terminal formed at circular section).

The second aspect of the present invention is a pressing tool for use in the method of manufacturing the battery as the first aspect of the present invention, and the tool includes a blade for pressing the flanged portion, in which the blade has a variation in projecting amount.

In the other preferable embodiment of the pressing tool, the tool includes a blade for pressing the flanged portion, in which the blade has a variation in pressing area.

The third aspect of the present invention is a battery, which includes a case provided with a through hole; an electric terminal fixed to the through hole with projecting outward from the case; an insulating member interposed between the case and the terminal; a flanged portion standing out from the case, located around the through hole; and a reinforcing member fitted to an outer periphery of the flanged portion, for reinforcing against an outward force.

In the embodiment of the battery, the fitted portion between the terminal and the through hole is formed by performing a press-fitting on the flanged portion from outer side of the case for plastic deformation, with the terminal and the insulating member inserted in the through hole.

In the advantageous embodiment, the reinforcing member is composed of a material having higher strength than the case.

In the preferable embodiment, the reinforcing member has a portion where is different in thickness in the direction from inner periphery to outer periphery of the flanged portion.

Effect of the Invention

According to the present invention, the battery is obtained that includes a case and an electric terminal fitted to the case with projecting therefrom, provided with high sealing property at the fitted portion between the case and terminal.

Figure 1:
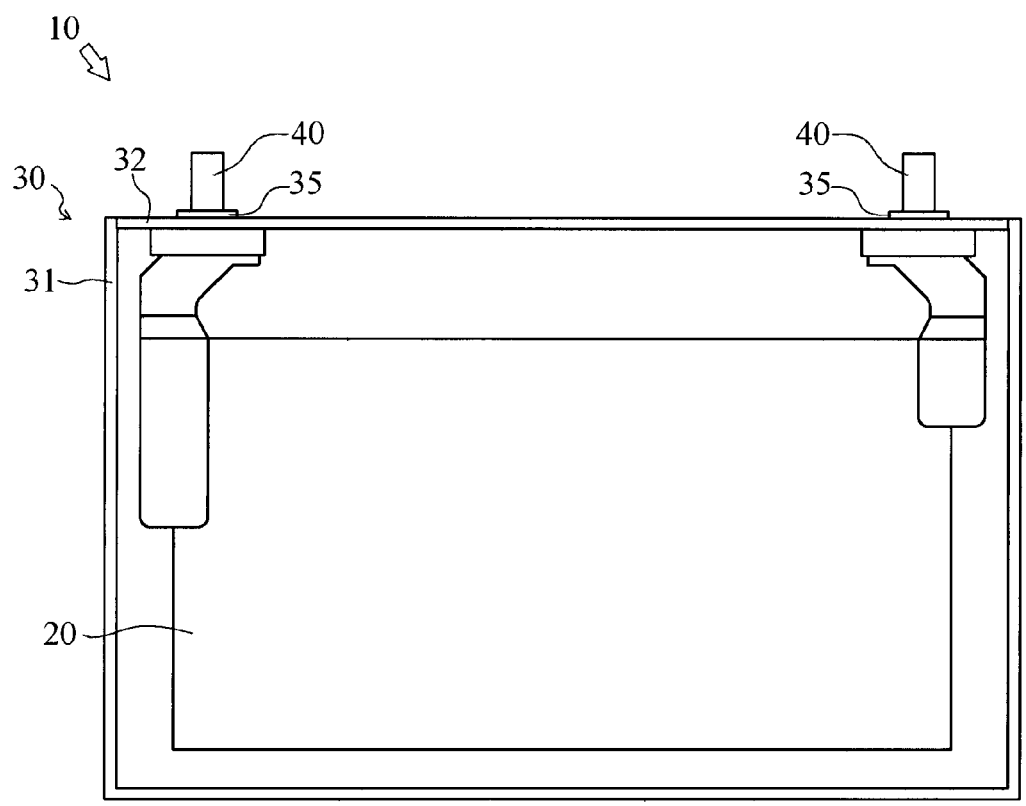
FIG. 1 depicts a battery according to the present invention.

EXPLANATION OF NUMERALS 10 battery
30 case
32 lid
33 through hole
34 flanged portion
35 reinforcing ring (reinforcing member)
40 electric terminal
50 insulating member

THE BEST MODE FOR CARRYING OUT THE INVENTION

Referring FIG. 1, the structure of a battery 10 as an embodiment of the present invention is explained below.

The battery 10 is composed as a rechargeable secondary battery such as a lithium ion secondary battery, nickel-metal hydride battery and the like.

As shown in FIG. 1, the battery 10 includes a power generating element 20 contained in a case 30. The case 30 is penetrated by electric terminals 40 projecting outward.

The element 20 is made of an electrode body with electrolyte impregnation, which is formed by laminating or winding a positive electrode, a negative electrode and a separator. When charging or discharging the battery 10, a chemical reaction is occurred in the element 20 (in detail, the ion moves between the positive and negative electrodes through the electrolytes), so the battery 10 serves as the rechargeable secondary battery.

The case 30 includes a box 31 and a lid 32. The box 31 has a closed-end shape and an opening at one side, and contains the element 20. The lid 32 has a shape in accordance with the opening of the box 31, which covers the opening of the box 31 and is fixed to the box 31.

The terminals 40 are configured as a positive terminal or a negative terminal, each of which is fitted into the case 30 projecting from the outer periphery of the case 30. The terminals 40 are electrically connected to the positive electrode or negative electrode of the element 20 via suitable wires such as lead terminals, and the electrodes 40 transmit the electric power between the inside and outside of the battery 10. The terminals 40 are electric paths to the outside. The terminal 40 has a thread portion formed at the periphery, configured by thread rolling.

Referring FIGS. 2 to 5, the fitting embodiment among the case 30 and the terminals 40 is explained below.

The terminals 40 are fitted into the lid 32 of the case 30 interposing insulating members 50 therebetween, which secure the insulating property between the terminals 40 and the case 30. When fitting the terminals 40, a part of the lid 32 is press-fitted to press and fix the terminals 40 and insulating members 50 firmly. Thus, the sealing property between the lid 32 and the terminals 40 is secured.

Figure 2:
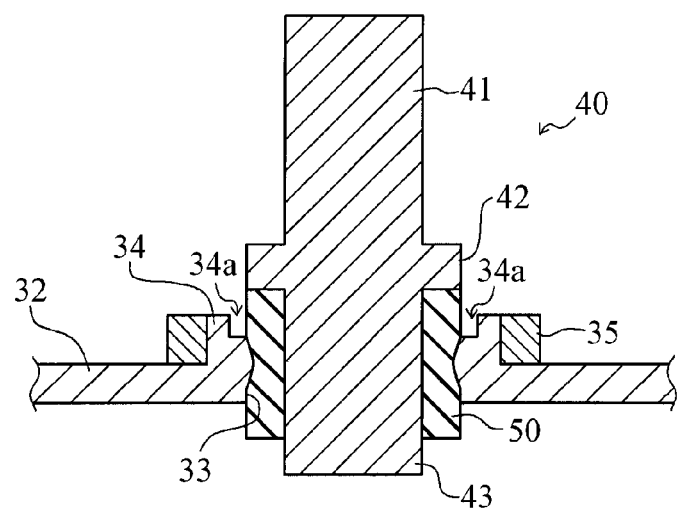
FIG. 2 is an enlarged section view illustrating a fitted portion of the case and terminal.

As shown in FIG. 2, the lid 32 has a pair of through holes 33 through which the terminals 40 pass.

The holes 33 are formed at predetermined diameters and penetrate the lid 32 in the thickness direction (in the vertical direction shown in drawings).

The hole 33 has an edge defined by a flanged portion 34.

The flanged portion 34 is formed at the edge of the hole 33 and stands out from the case 30 from inside to outside thereof (in the vertical direction shown in drawings). The flanged portion 34 is projected from the outer face of the lid 32, and defines the hole 33 at the inner wall thereof.

The part of the lid 32 (around the hole 33) is plastically deformed to form the flanged portion 34, which is formed by burring processing, deep drawing, damming, or the like.

The flanged portion 34 is engaged with a reinforcing ring 35 at the outer periphery thereof.

The ring 35 is made of a metal material having higher strength than that of the case 30 (especially of the lid 32) and reinforces against the force applied to the flanged portion 34. The inner diameter of the ring 35 is set as substantially same as the outer diameter of the flanged portion 34. The length in the axial direction (the length in the projecting direction of the flanged portion 34) of the ring 35 is set in accordance with the projecting amount of the flanged portion 34, in the embodiment, set as the same as the projecting amount of the flanged portion 34 or longer.

The ring 35 is manufactured by punching a metal plate using an appropriate press apparatus. When the battery 10 is the lithium ion secondary battery, the case 30 (the box 31 and the lid 32) is popularly made of aluminum.

Contrastingly, the ring 35 may be made of higher strength material than aluminum such as iron or plated iron, which has sufficient strength and extensibility.

In the embodiment, "high strength" means high mechanical property, especially tensile strength, extensibility and hardness.

The terminal 40 is configured as a round terminal having circular section, and as shown in FIG. 2, has a projecting portion 41, an enlarged portion 42 and a fitted portion 43.

The projecting portion 41 is formed at one end of the terminal 40 (the end located outside of the battery 10, and the upper end shown in the drawing), has a column shape, and projects outward from the case 30. The projecting portion 41 is used as a connecting part to external devices (e.g. a power source, a device using the electric power of the battery, other batteries), and the connecting terminals of the external devices are fixed to the projecting portion 41. In the respect that the projecting portion 41 serves as the connecting part to the external devices, the portion is formed with the thread portion at the outer periphery thereof.

The enlarged portion 42 is formed continuously to the projecting portion 41, and has a column shape enlarged toward radial direction. The outer diameter of the enlarged portion 42 is larger than that of the projecting portion 41 and fitted portion 43, and when connecting the connecting terminal to the projecting portion 41, the connecting terminal face-contacts the enlarged portion, thereby lowering the connecting resistance. The enlarged portion 42 has the largest outer diameter in the terminal 40, the outer diameter is set in accordance with the inner diameter of the hole 33 provided in the lid 32. For example, it is advantageous to set the outer diameter of the enlarged portion 42 as the same as the inner diameter of the hole 33 and the same as the outer diameter of the insulating member 50 so that the surface area of the enlarged portion is preferably set as large as possible. The lower end face of the enlarged portion 42 is engaged with the insulating member 50.

The fitted portion 43 is formed at the other end of the terminal 40 (the end located inside of the battery 10, and the lower end shown in the drawing), and has a substantially column shape for fitting to the lid 32 and for connecting to the lead terminals connected with the element 20. The length in the axial direction of the fitted portion 43 is set larger than the thickness of the lid 32 (that is the extended length of the flanged portion 34) and set as the same as that of the insulating member 50 or longer. The insulating member 50 is arranged to surround the outside (strictly explaining, the whole circumference of a part in the axial direction) of the fitted portion 43.

The insulating member 50 for insulating among the case 30 and the terminal 40 is interposed between the flanged portion 34 of the lid 32 and the fitted portion 43 of the terminal 40.

The insulating member 50 has a shape in accordance with the flanged portion 34 and the fitted portion 43, in the embodiment, has the tube shape. The insulating member 50 surrounds the fitted portion 43.

The length in the axial direction of the insulating member 50 is set as the same as the fitted portion 43 or longer. In detail, the axial length of the insulating member 50 is set such that there exists the proper length for insulating between the outer periphery of the terminal 40 (especially the enlarged portion 42 and fitted portion 43) and the flanged portion 34 when the terminal 40 is fixed to the lid 32.

The insulating member 50 is preferably made of material with fine high-temperature creep characteristic, that is the material having the long creep property against the temperature cycle of the battery 10, e.g. PEEK (poly (etheretherketone)).

The insulating member 50 also acts as the sealing member for securing the sealing property in the battery 10.

As shown in FIG. 2, the inside portion of the projected end of the flanged portion 34 is wholly press-fitted (in other words, the material plastically moves in response to press) from outside of the battery 10 (upper side in FIG. 2).

Thus, at the inside portion of the flanged portion 34, a press-fitted portion 34a is formed so as to expand toward inside. Here, the reinforcing ring 35 composed of the material with higher strength than the flanged portion 34 is arranged to surround the flanged portion 34, whereby the pressure applied during press-fitting is not relieved outward and the press-fitted portion 34a expands inward (toward the terminal 40).

The press-fitted portion 34a expanded inward presses the insulating member 50, and the pressure is applied to the insulating member 50 as contact surface pressure. The portion in the insulating member 50 to which the contact surface pressure applied by the flanged portion 34a elastically deforms inward, and the force in accordance with the elastic deformation is applied to the fitted portion 43 as contact surface pressure.

Thus, the flanged portion 34 is press-fitted from upper side at the inside portion of the upper end, forming the press-fitted portion 34a expanding inward, thereby the contact surface pressure is transmitted from the flanged portion 34 to the fitted portion 43 through the insulating member 50. Due to the transmitted contact surface pressure, the fitted portion 43 receives the fitting force so that the terminal 40 is fixed to the lid 32 of the case 30.

Due to the plastic deformation of the press-fitted portion 34a and the elastic deformation of the insulating member 50, there is no gap among the flanged portion 34, the insulating member 50 and the fitted portion 43, occurring high bonding force therebetween, and the sealing property between the case 30 and terminal 40 is secured, thereby keeping the sealing property of the battery 10. The press-fitted portion 34a is press-fitted in the direction perpendicular to the expanding direction, so that the press-fitted portion does not return (loosen) according to the high contact surface pressure and friction force acting on the expanded portion.

As described above, the reinforcing ring 35 improves the sealing property of the battery 10, surrounding the flanged portion 34.

Moreover, the reinforcing ring 35 improves pressure resistance of the battery 10 and provides long life with the battery 10. The details are explained below.

When the defect like a short circuit occurred in the battery 10 results in the raising of the inner pressure of the case 30, the flanged portion 34 is forced by the pressure and the flanged portion 34 is forced to deform outward. In this case, the flanged portion 34 sticks to the ring 35, thereby preventing the deformation of the flanged portion 34. Therefore, the pressure resistance around the hole 33 of the lid 32 is improved.

Thus, if the battery 10 repeats the temperature cycle for a long time, the sealing property is maintained in the fitting portion of the terminal 40 to the case 30 and the life of the battery 10 is improved.

Furthermore, if the defect occurs in the battery 10, the gas does not leak out from the case 30, but is released through the safety unit such as the relief valve provided in the battery 10, the safety design of the battery 10 is maintained.

Note that the flanged portions 34 are configured by plastic forming for the lid 32, in other words, the materials of the flanged portions are the same as the lid 32, on which the inside environment (electrolytes, gas or the like) of the battery 10 does not have corrosive influence, so that the life of the battery 10 is guaranteed.

The material of the ring 35 has higher strength than that of the lid 32, so that when the flanged portion 34 is forced by the stress in the radial outward direction, the flanged portion 34 deforms prior to the ring 35 and sticks to the ring 35 from the forced portion. Thus, the flanged portion 34 does not expand beyond the ring 35, and the outer diameter of the flanged portion 34 does not change. Therefore, the pressure resistance is maintained in the battery 10.

Figure 3:
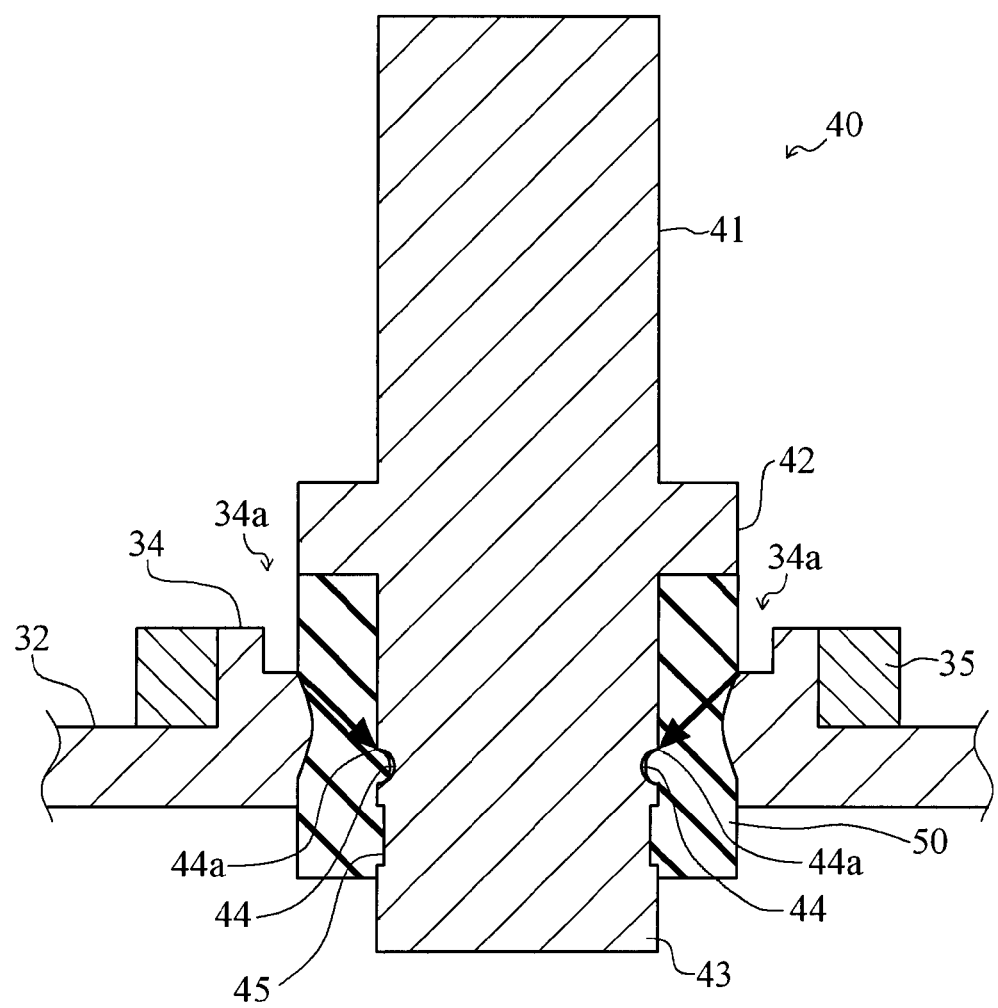
FIG. 3 is an enlarged section view illustrating the terminal and the insulating member.

As shown in FIG. 3, the fitted portion 43 preferably includes a groove 44 and a knurling pattern 45.

The groove 44 is a recess formed along the outer periphery of the fitted portion 43, and has an edge 44a at the outer side with respect to the battery 10 (formed at the upper side of the groove 44). The groove 44 is formed by, for example, grooving process and formed in a round shape.

The edge 44a defines the edge line of the groove 44, and is formed as a sharp edge such as right angle or obtuse angle or the like. The edge 44a is arranged at the line of principal stress (arrowed line in FIG. 3) extended from the inside edge of the press-fitted portion 34a. That is, the edge 44a is formed such that the pressure applied to the press-fitted portion 34a is most sufficiently transmitted to the edge 44a.

The knurling pattern 45 is a group of recesses and projections formed at the outer periphery of the fitted portion 43. The knurling pattern 45 is arranged at the more inner side of the battery 10 than the groove 44 and at the area in the fitted portion 43 where the contact surface pressure applied to the press-fitted portion 34a acts. The knurling pattern 45 is a pattern of recesses and projections, which is formed in a knurling process performed on the outer periphery of the fitted portion 43, using the conventional knurling tool.

Thus, the contact surface pressure from the press-fitted portion 34a makes the insulating member 50 stick to the knurling pattern 45, so that the knurling pattern 45 increases the friction force between the terminal 40 and insulating member 50, thereby improving torque resistance.

It should be noted that the knurling process is preferably performed with the thread rolling for the terminal 40.

Figure 4:
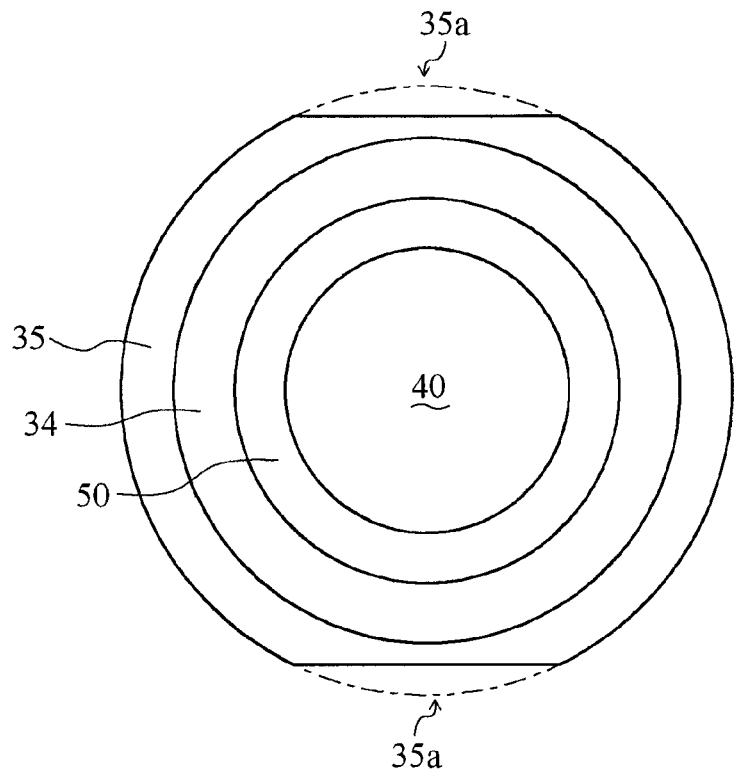
FIG. 4 depicts a reinforcing ring.

As shown in FIG. 4, the ring 35 has cut portions 35a.

The cut portion 35a is a chord portion formed by cutting the part of the outer periphery of the ring 35. In other words, the ring 35 has portions at the outer periphery where the length is not constant from the inner periphery fitting along the outer periphery of the flanged portion 34, and the ring 35 includes the portions which differ in the thickness in the direction from the inner periphery to the outer periphery (radial direction of the ring 35).

The cut portions 35a are arranged diagonally. The ring 35 is fitted to the flanged portion 34 such that each cut portion 35a is positioned in the end locating in width-narrow direction of the lid 32 (see FIGS. 7, 8).

Due to the arrangement that the cut portions 35a face the width narrow side of the lid 32, when the ring 35 deforms in cooperated with the deformation of the flanged portion 34, the ring 35 does not interfere the end of the lid 32.

Figure 5:
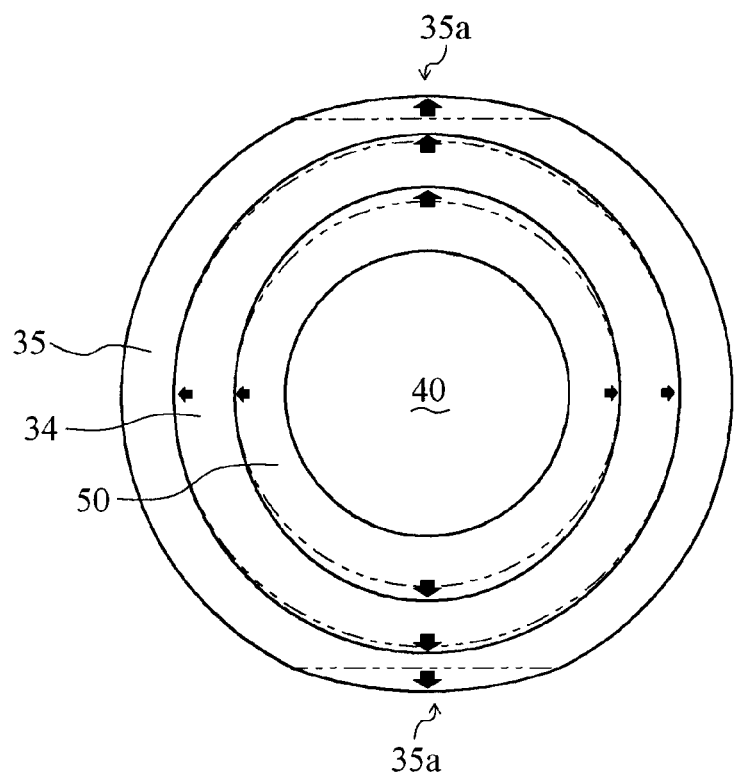
FIG. 5 depicts a deformation of the reinforcing ring in response to the force applied in the expanding direction.

As shown in FIG. 5, there exists the difference in the thickness along the radial direction of the ring 35, so that when the external force is applied in the radial outward direction of the ring 35 (when press-fitting the flanged portion 34), there occurs distribution in the contact surface pressure in the circumferential direction of the ring 35. The deformation amount in the circumferential direction of the ring 35 differs in accordance with the pressure distribution, and thus the ring 35 deforms from circular shape to non-circular shape.

To follow the deformation of the ring 35, the flanged portion 34 and insulating member 50 deform from the circular shape, so that when the torque is applied to the round terminal 40, the shapes of the flanged portion 34 and insulating member 50 prevent the terminal 40 from rotating.

Thus, the fitting property as well as the sealing property of the terminal 40 is secured. For instance, if the torque is applied to the terminal 40 when connecting the connecting terminal of the external device to the projecting portion 41 of the terminal 40, the terminal 40 is prevented from rotating, so that the sealing property of the battery 10 is secured, without forming slight space among the terminal 40 and the surroundings.

In the embodiment, the torque resistance between the terminal 40 and the insulating member 50 is also improved by the knurling pattern 45 formed at the outer periphery of the fitted portion 43 of the terminal 40.

In the present embodiment, the ring 35 has two cut portions 35a, which form two chord portions in the ring 35, however the structure is not limited. The structure may be adopted that the radial thickness of the ring 35 is not constant and the contact surface pressure occurred in press-fitting has distribution; for example, in which one cut portion or three or more cut portions 35a are configured, or in which the outer periphery of the ring 35 is partially cut in the curve shape.

Referring FIGS. 6 to 9, a step S1 of manufacturing the battery 10 is explained below.

Figure 6:
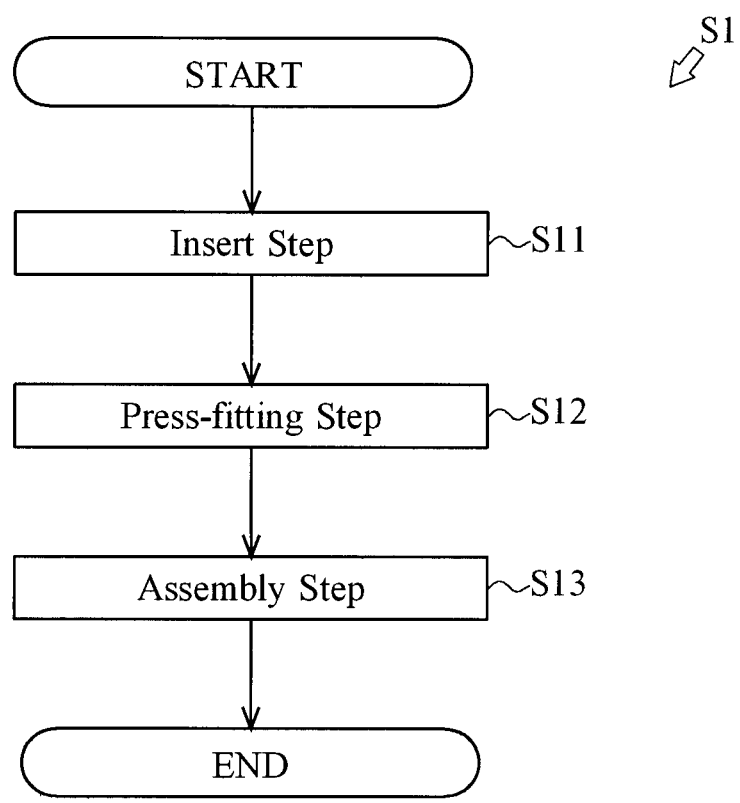
FIG. 6 is a flowchart of a step of manufacturing the battery.

As shown in FIG. 6, the step S1 includes an insert step S11, a press-fitting step S12, and an assembly step S13.

Note that, before the insert step S11, the flanged portions 34 define the holes 33, performing the forming process on the lid 32 around the holes 33.

Figure 7:
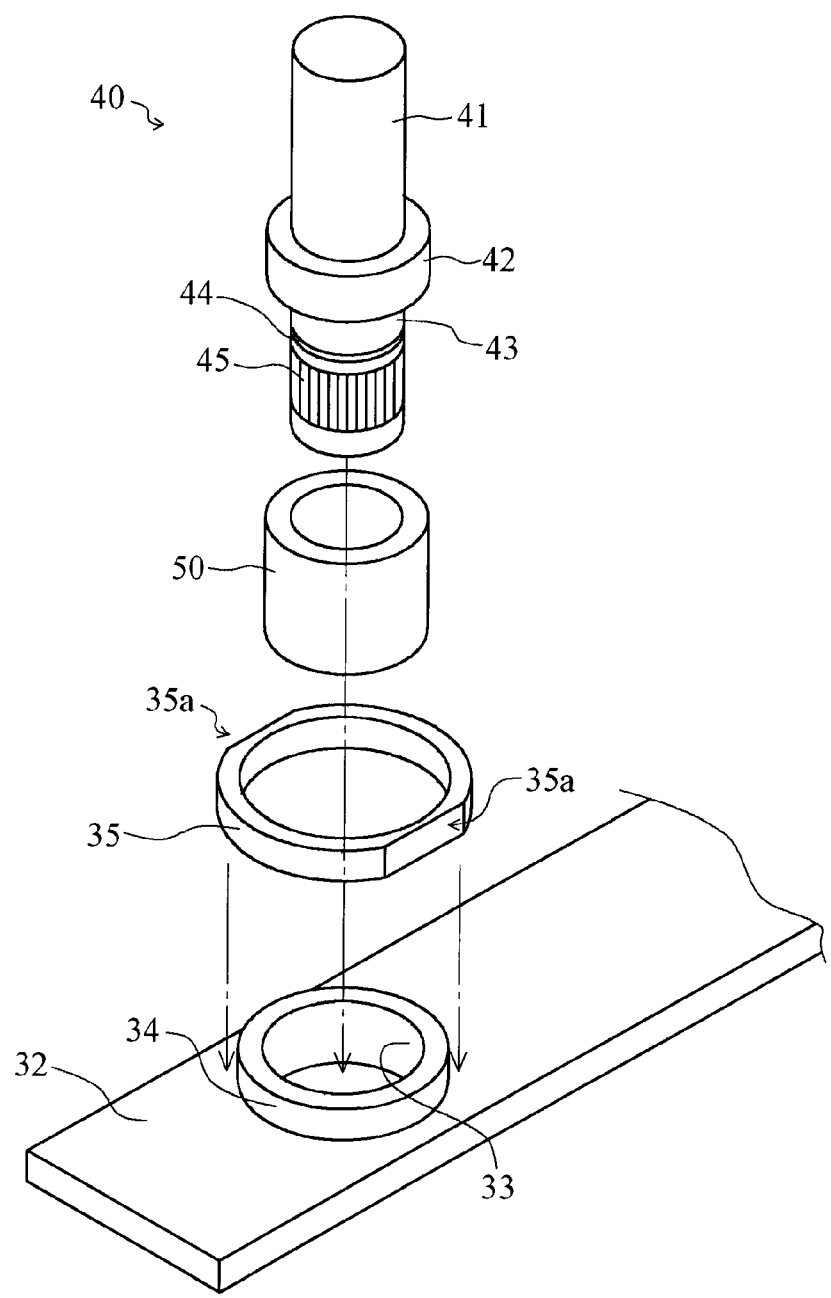
FIG. 7 is a perspective view illustrating the insert step.

As shown in FIG. 7, in the insert step S11, the reinforcing ring 35 is fitted to the flanged portion 34, and the terminal 40 including the fitted portion 43 surrounded by the insulating member 50 is inserted to the through hole 33.

Concretely, the terminal 40 and insulating member 50 are inserted such that the upper and lower ends of the insulating member 50 are spaced sufficiently from the upper and lower ends of the flanged portion 34. Further, the edge 44a of the groove 44 provided in the terminal 40 is located at the predetermined position. In detail, the terminal 40 is inserted in such a way that the edge 44a is located at the line inclined downward by 45 degrees from the inner upper end of the press-fitted portion 34a formed in the following step S12.

Figure 8:
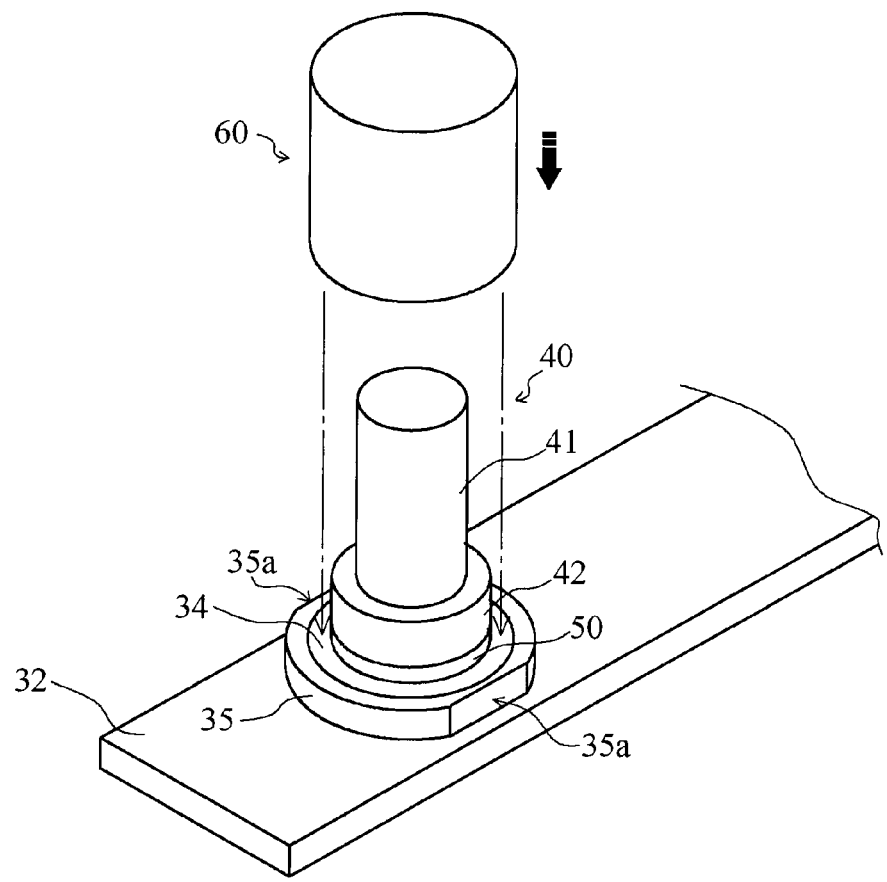
FIG. 8 is a perspective view illustrating the press-fitting step.

As shown in FIG. 8, in the press-fitting step S12, the flanged portion 34 is press-fitted from the upper side using a punch 60.

Figure 9:
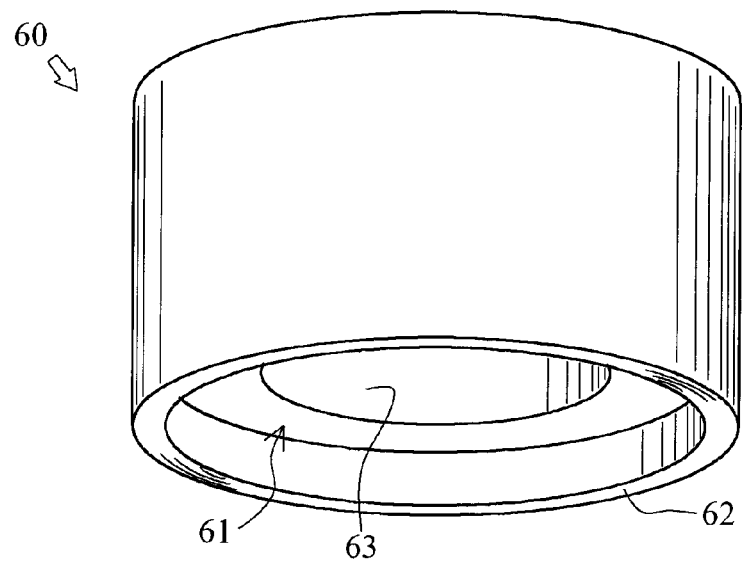
FIG. 9 is a perspective view illustrating the punch for use in the press-fitting step.

As shown in FIG. 9, the punch 60 is configured as a press mold having an opening 61 and a blade 62 at the pressing end thereof (lower end in the drawing). The opening 61 has a circular section in accordance with the flange portion 34. The opening 61 has the inner diameter as same as that of the flanged portion 34 and the appropriate depth (vertical length). The opening 61 is provided with a hole 63 formed at the bottom through which the terminal 40 can penetrate. The inside wall of the opening 61 is extended as the blade 62 projecting downward from the bottom end. The blade 62 has predetermined radial thickness and is extended at the predetermined length.

The punch 60 moves to the bottom of the opening 61, and the blade 62 presses the inside portion of the flanged portion 34, whereby the material is plastically deformed and press-fitted.

Concretely, the punch 60 presses the inside portion of the flanged portion 34 from upper side, and the press-fitted portion 34a is formed in the inside circumferential portion of the flanged portion 34.

The press-fitted portion 34a is, as above-mentioned, inhibited to expand outward (toward the ring 35) due to the ring 35, and expands inward (toward the terminal 40). Since the press-fitted portion 34a expands inward, the pressure is applied to the terminal 40 through the insulating member 50. Thus, the pressure occurs between the flanged portion 34 (the press-fitted portion 34a) and the insulating member 50 and between the insulating member 50 and the terminal 40 (fitted portion 43), so that the terminal 40 is fixed in the hole 33.

Here, the ring 35 arranged in the outer periphery of the flanged portion 34 includes the cut portions 35a, and when the punch 60 presses, there occurs the difference in contact surface pressure generated among the ring 35 and flanged portion 34 between the cut portion 35a and the rest portion. Thus, the pressure transmitted to the insulating member 50 from the ring 35 have the distribution, so that the sectional shapes of the flanged portion 34 and insulating member 50 change circular into oval (see FIG. 5).

The terminal 40 has the groove 44 provided with the edge 44a, and the insulating member 50 sticks to the edge 44a at the area where the largest pressure is applied from the press-fitted portion 34a, thereby increasing the sticking force between the insulating member 50 and the terminal 40.

In the press-fitting step S12, the flanged portion 34 is press-fitted from the upper side using the punch 60, and the insulating member 50 and the terminal 40 inserted in the flanged portion 34 are fixed firmly.

In the assembly step S13, the power generating element 20 and the terminals 40 are connected via the lead terminals. Thus, the element 20, the lid 32 and the terminals 40 are integrally fixed.

After the assembly step S13, the following steps are performed to manufacture the battery 10, such as the step of welding the lid 32 and the box 31 and the step of pouring the electrolytes into the case 30.

As explained above, due to the press-fitting step S12, the flanged portion 34, the insulating member 50 and the terminals 40 are firmly fixed. The step S1 including the press-fitting step S12 provides the battery 10 with high sealing property in the holes 33 of the lid 32.

Furthermore, the flanged portion 34 standing out around the hole 33 is surrounded by the ring 35 that is composed of the stronger material than the flanged portion 34, so that the ring 35 provides high pressure resistance in the hole 33, against high pressure acting on the hole 33.

The ring 35 has the cut portions 35a and the variation occurs in the radial thickness of the ring 35, so that during the press-fitting in the press-fitting step S12, the flanged portion 34 and the insulating member 50 are deformed to non-circular shapes. Thus, the torque resistance of the terminal 40 is improved.

In the embodiment explained above, the reinforcing ring 35 includes the cut portions 35a so that there is a variation in the thickness of the ring 35 in the circumferential direction, providing the difference in the contact surface pressure generated during the press-fitting, and the flanged portion 34 and the insulating member 50 are deformed from the circular shape to the non-circular shape. The structure improves the torque resistance against the rotation of the terminal 40.

Figure 10:
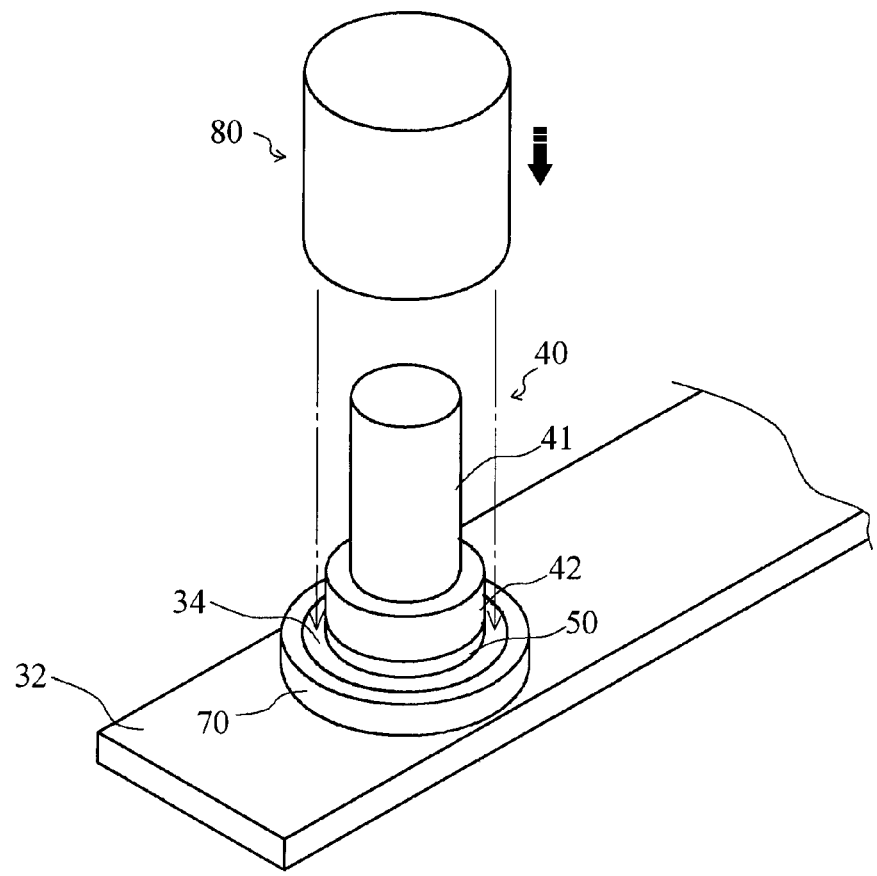
FIG. 10 is a perspective view illustrating the other press-fitting step using the other punch and reinforcing ring.

The means for improving the torque resistance of the round terminal 40 is not limited in the above-mentioned structure; for example, FIG. 10 depicts the other embodiment, in which a reinforcing ring 70 having constant thickness is fitted around the flanged portion 34 in the insert step S11 and a punch 80 is used for the press-fitting step S12.

The ring 70 has constant thickness in the circumferential direction, and configured as substantially same as the ring 35 except in the cut portions 35a.

Figure 11:
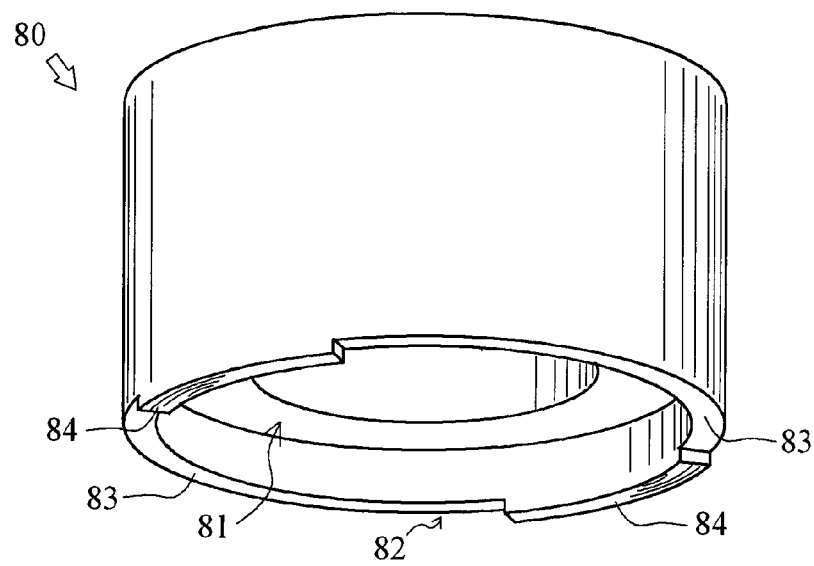
FIG. 11 is a perspective view illustrating the other punch.

As shown in FIG. 11, the punch 80 is a press mold including an opening 81 and a blade 82 formed at the pressing end (lower end in the drawing). The opening 81 is configured as the same as the opening 61 of the punch 60. The blade 82 is formed at the predetermined thickness in the radial direction.

The blade 82 includes first blades 83 projecting to the pressing direction at predetermined length, and second blades 84 projecting longer than the first blades 83. The second blades 84 are the step portions formed at the predetermined projecting amount toward the pressing direction, and the blades 84 are arranged diagonally.

Figure 12:
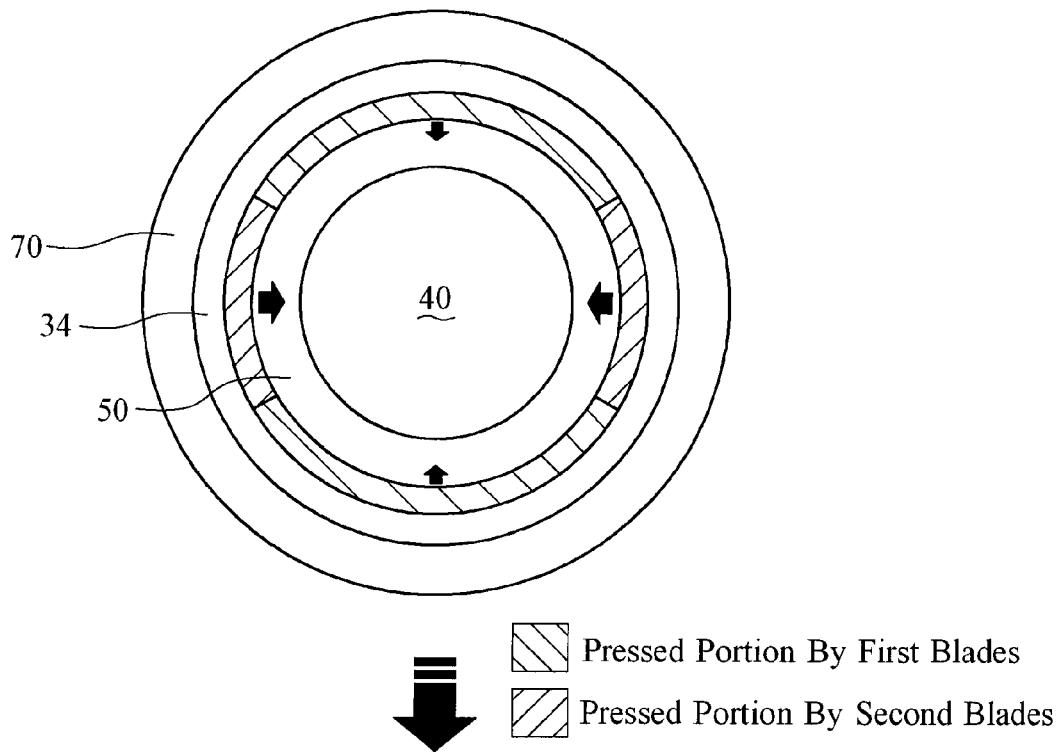
FIG. 12 depicts the deformation of the flanged portion during the press-fitting step.
Figure 12:
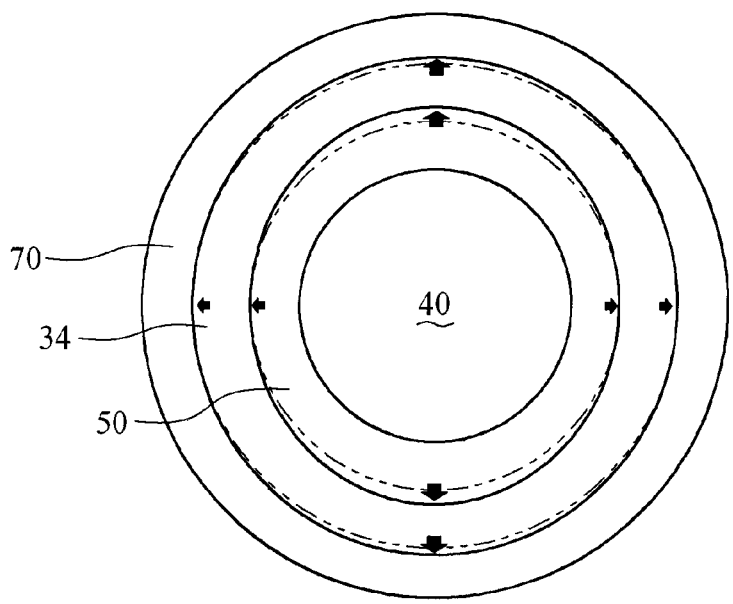

When performing the press-fitting step S12 using the punch 80, as shown in FIG. 12, the forcing amount of the second blade 84 is greater than that of the first blade 83, so that in the pressed portions by the second blades 84, the deforming amount (plastic deformation amount during the press-fitting) of the flanged portion 34 becomes larger. So, when using the punch 80 to press-fit the flanged portion 34, the flanged portion 34 deforms from the circular shape to the non-circular shape.

Thus, the flanged portion 34 and the insulating member 50 are changed into non-circular shape, thereby enabled to obtain the same effects as when the punch 60 press-fits the flanged portion 34 surrounded by the reinforcing ring 35.

As explained above, according to the press-fitting step S12 using the punch 80 provided with the blade 82 having the different projecting amount, the torque resistance is improved against the rotation of the round terminal 40.

Figure 13:
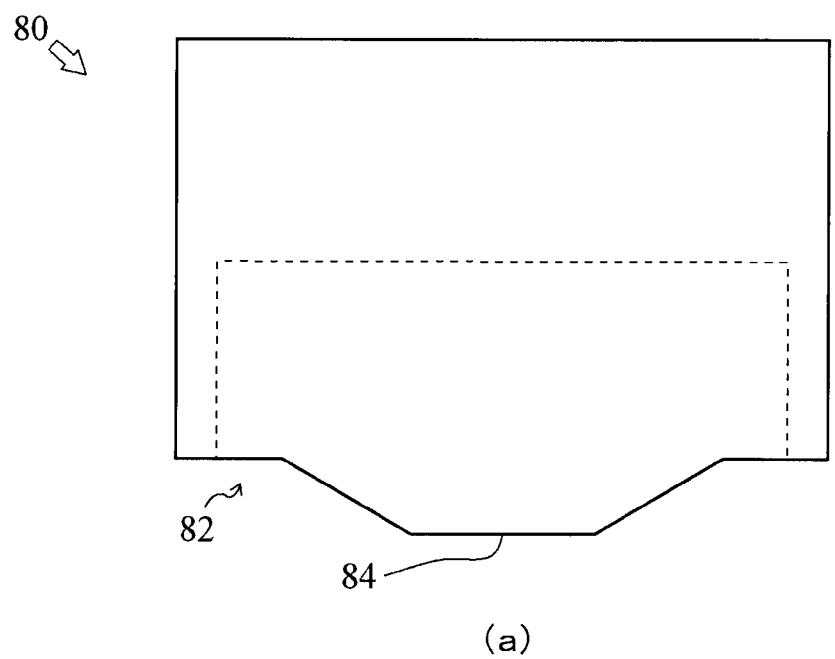
FIG. 13 depicts the other punch.
Figure 13:
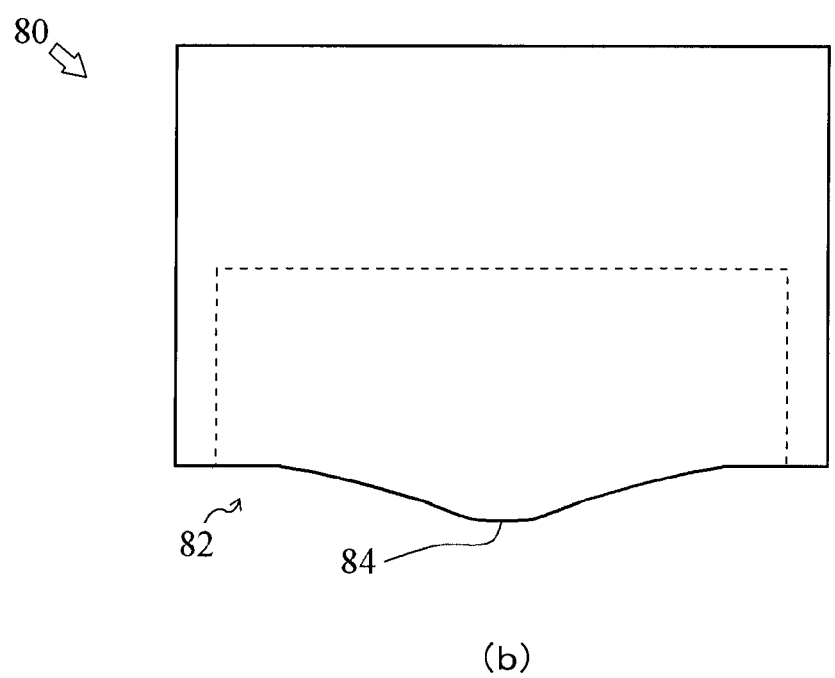

Additionally, the shape of the second blade 84 is not limited in the step shape, and may be the shape having the greater projecting length, such as the tapered shape (see FIG. 13(*a*)) and the wave shape (see FIG. 13(*b*)).

Figure 14:
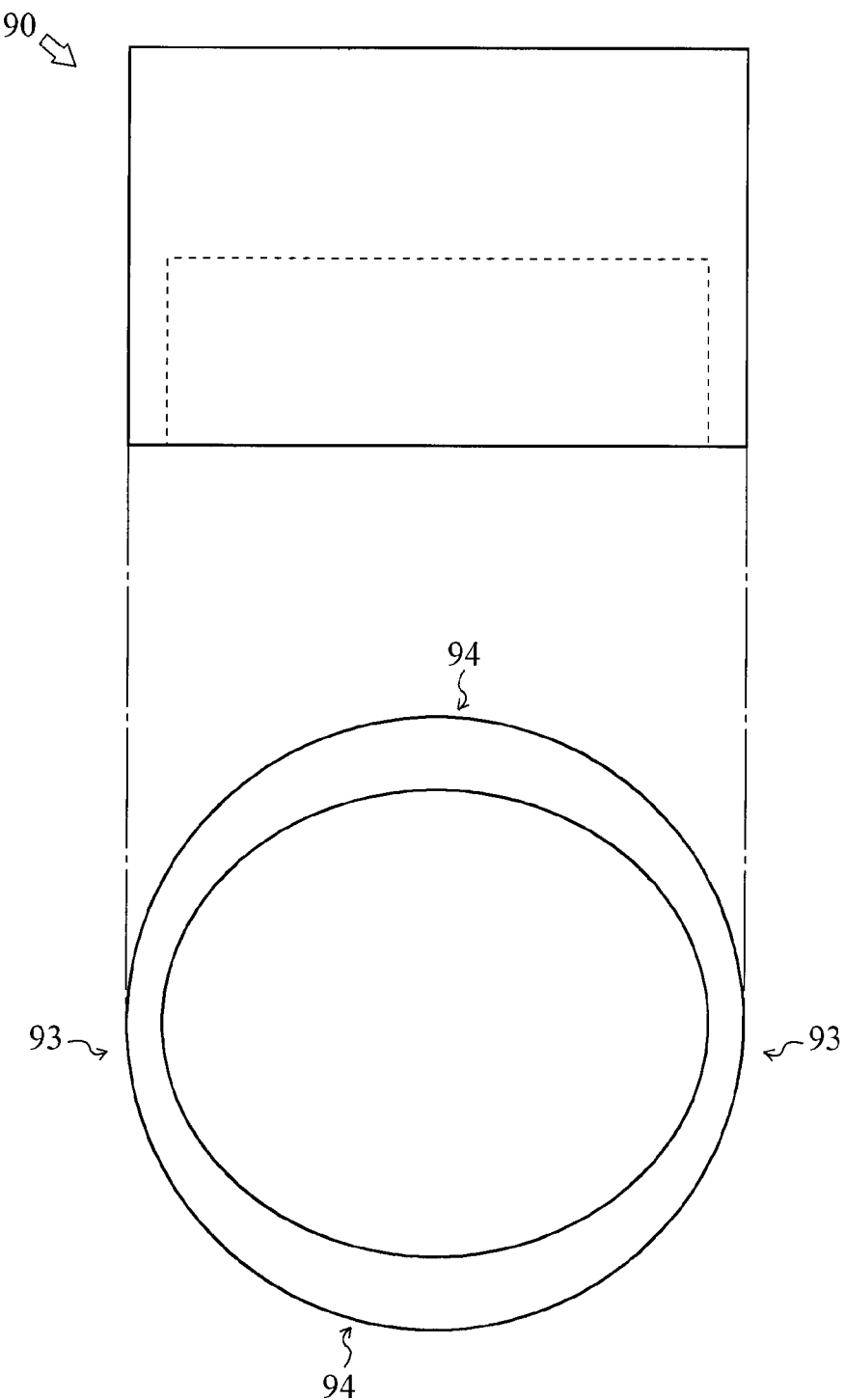
FIG. 14 depicts the other punch.

In the other embodiment without the structure that the pressing blade has the variation in the projecting amount so as to make the distribution in the forcing amount, there is a difference in the forcing area (contact area) of the blade, e.g. a punch 90 depicted in FIG. 14.

As shown in FIG. 14, the punch 90 includes first blades 93 formed at predetermined thickness in the radial direction and second blades 94 formed at greater thickness than the first blades 93. The second blades 94 are formed as the wide portions, which have the greater forcing area then the first blades 93.

Thus, when performing the press-fitting step S12 using the punch 90, the forcing amount of the second blade 94 is greater than that of the first blade 93, so that in the pressed portions by the second blades 94, the deforming amount (plastic deformation amount during the press-fitting) of the flanged portion 34 becomes larger. So, when using the punch 90 to press-fit the flanged portion 34, the flanged portion 34 deforms from the circular shape to the non-circular shape.

Figure 15:
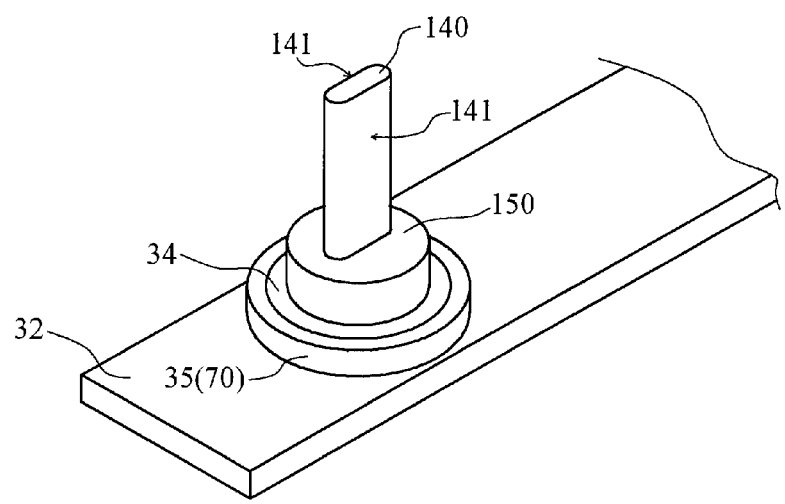
FIG. 15 is a perspective view illustrating the other press-fitting step using the other terminal and insulating member.

In the above-explained embodiment, the round terminal 40 is fitted into the case 30, however the electric terminal according to the present invention may be an electric terminal 140, shown in FIG. 15, having the substantially rectangular section (ellipse section), which is also fitted into the case 30 (the lid 32).

The terminal 140 has the same function as the terminal 40. The terminal 140 is a flat terminal formed at the flat shape and has a substantially rectangular section. In other words, the terminal 140 has flat portions 141 having flat faces.

As shown in FIG. 15, the terminal 140 is fixed to the lid 32 interposing an insulating member 150 therebetween. The insulating member 150 has column shape and a hole 151 capable of being penetrated by the terminal 140.

In the press-fitting step S12, the flanged portion 34 is press-fitted with the terminal 140 inserted into the hole 151 of the insulating member 150. The terminal 140 is press-fitted in the situation that there is a difference in the distance between the outer periphery of the insulating member 150 and the hole 151, so that it is necessary to force by the greater contact surface pressure in the longer distance portion than in the shorter distance portion.

In the embodiment, the press-fitting step S12 employs the either method of (1) using the punch 60 to press-fit the flanged portion 34 fitted by the reinforcing ring 35, or (2) using the punch 80 or punch 90 to press-fit the flanged portion 34 fitted by the reinforcing ring 70, and the appropriate contact surface pressure is applied to the insulating member 150 and the terminal 140, thereby fixing the terminal 140 to the lid 32 firmly.

Figure 16:
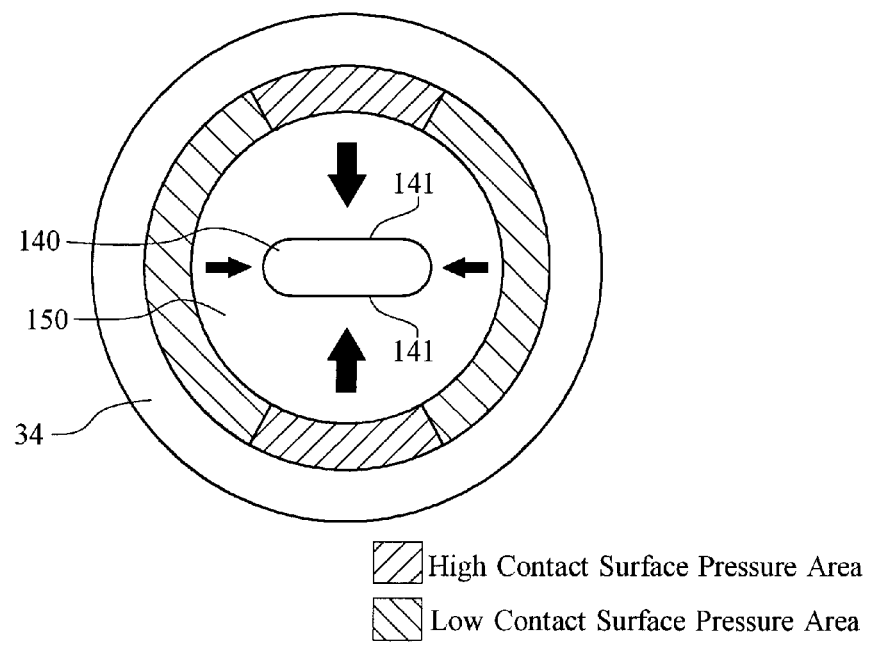
FIG. 16 depicts the deformation of the flanged portion during the press-fitting step in which the other terminal and insulating member are applied.

Regarding the method (1), the deforming amount is larger in the area where the cut portions 35a of the ring 35 are located, so the ring 35 is set such that the cut portions 35a face the flat portions 141 of the terminal 140 and the punch 60 presses the flanged portion 34, thereby generating the proper contact surface pressure between the insulating member 150 and the terminal 140 (see FIG. 16).

Regarding the method (2), the deforming amount is larger in the area where the second blades 84 are located in the blade 82 of the punch 80, so that the pressed portions by the second blades 84 are arranged to face the flat portions 141 of the terminal 140 and the punch 80 presses the flanged portion 34, thereby generating the proper contact surface pressure between the insulating member 150 and the terminal 140 (see FIG. 16).

The method using the punch 90 is the same as above-explained structure, so that we omit the explanation.

As explained above, the press-fitting step S12 according to the present invention is advantageously applicable to the terminal 140 which has deformed section as well as the popular round terminal (such as the terminal 40 having circular section). That is, the manufacturing step S1 is flexibly applied without limiting the embodiment of the electric terminal.

Figure 17:
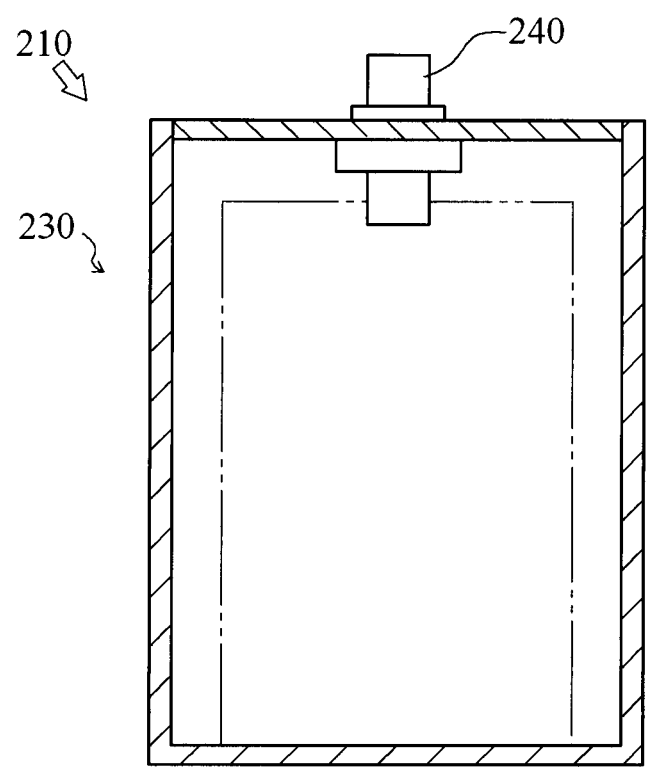
FIG. 17 depicts the other battery.

Note that the embodiment refers to the step S1 of manufacturing the battery 10 including the rectangular case 30 and two terminals 40 (or terminals 140) projecting outward from the case, however the battery according to the present invention is not limited in that, for example, as shown in FIG. 17, a battery 210 including a round case 230 and a terminal 240 projecting outward from the case. The battery 210 is the conventional round battery, so that we omit the detailed explanation.

INDUSTRIAL APPLICABILITY

The present invention is applicable to a battery including a case and an electric terminal projecting from the case, especially to the technique of securing sealing property in the through hole formed in the case through which the terminal penetrates.

The invention claimed is:

1. A battery, comprising:
a case provided with a through hole;
an electric terminal fixed to the through hole with and projecting outward from the case;
an insulating member interposed between the case and the terminal;
a flanged portion standing out from the case, located around the through hole; and
a reinforcing member fitted to an outer periphery of the flanged portion, for reinforcing against an outward force,
wherein a press-fitted portion between the terminal and the through hole is formed by performing a press-fitting on the flanged portion from an outer side of the case and in a direction along an axial direction of the terminal for plastic deformation in a direction perpendicular to the axial direction of the terminal, with the terminal and the insulating member inserted in the through hole.

2. The battery according to claim 1,
wherein the reinforcing member is composed of a material having higher strength than the case.

3. The battery according to claim 1,
wherein the reinforcing member includes first and second portions each having a respective thickness in a direction from an inner periphery to the outer periphery of the flanged portion, that differs from one another.

* * * * *